United States Patent [19]

Gaul

[11] Patent Number: 4,477,157

[45] Date of Patent: Oct. 16, 1984

[54] UNIVERSAL REVOLVING STAGE FOR MICROSCOPES

[75] Inventor: Norbert Gaul, Solms, Fed. Rep. of Germany

[73] Assignee: Ernst Leitz Wetzlar GmbH, Wetzlar, Fed. Rep. of Germany

[21] Appl. No.: 393,726

[22] Filed: Jun. 30, 1982

[30] Foreign Application Priority Data

Jul. 4, 1981 [DE] Fed. Rep. of Germany ... 8119558[U]

[51] Int. Cl.³ .............................................. G02B 21/26
[52] U.S. Cl. .................................................... 350/532
[58] Field of Search ........................................ 350/532

[56] References Cited

FOREIGN PATENT DOCUMENTS 0579789 6/1933 Fed. Rep. of Germany ...... 350/532

*Primary Examiner*—Bruce Y. Arnold
*Assistant Examiner*—Lynn Vandenburgh
*Attorney, Agent, or Firm*—Schwartz, Jeffery, Schwaab, Mack, Blumenthal & Koch

[57] ABSTRACT

A universal revolving stage for microscopes having glass segments mounted in an upper and a lower segment mountings serves in particular to conduct crystal-optical investigations. Because of the differential thickness of the specimens to be examined, there is provided a height adjustment of the segment mountings by means of adjusting means actuated from above, in the form of a pinion. The adjusting means is rotated by a knurled knob which can be inserted into it, and it engages the internal teeth of an adjusting ring which has an adjusting thread. Upon rotation of the pinion and thus of the adjusting ring, the lower segment mounting is screwed upwardly or downwardly, and it carries with it the upper segment mounting which is centered by guides in the lower mounting.

4 Claims, 2 Drawing Figures

UNIVERSAL REVOLVING STAGE FOR MICROSCOPES

BACKGROUND OF THE INVENTION

The present invention pertains to a universal revolving stage for microscopes, in particular for crystal-optical investigations, having glass segments adjustable in height and fastened in upper and lower segment mountings, wherein the lower segment mounting is arranged in an adjusting thread of an adjusting ring mounted in a rotating ring.

A universal revolving stage for microscopes is known from German Pat. No. 579,789. For the purpose of examining specimens of different thickness, it has a specimen support which is adjustable in height, whereby the azimuthal position of the specimen is not altered by upward and downward adjustments. For this purpose, the lower, annular segment mounting is equipped with a thread, which is engaged by the adjusting thread of an adjusting ring. The latter has handles protruding in the downward direction. The rotation of the adjusting ring effects a movement along the optical axis of the lower segment mounting and of the upper segment mounting which is joined by adhesion with said lower segment mounting. The upper segment mounting has a recess on either side for guidance by means of guide screws.

Because of the difficult accessibility of the lower segment mounting in these universal revolving stages, the inclination of the individual rotational axes is often unintentionally altered during height adjustments, requiring time-consuming corrections. Furthermore, the centering of the glass segments by means of the guide screws is relatively inaccurate and requires a high degree of precision in fabrication.

SUMMARY OF THE INVENTION

It is therefore an object of the present invention to provide an improved universal revolving stage for microscopes.

It is also an object of the invention to provide a universal revolving stage for microscopes whereby the glass segments are necessarily centered and the adjustment in height of the segment mountings may be effected readily and without disturbing the position of the axes of rotation of the stage.

In accomplishing the foregoing objects, there has been provided in accordance with the present invention a universal revolving stage for microscopes, comprising upper and lower glass segments positioned one above the other, a lower segment mounting in which the lower glass segment is mounted and which has a threaded portion, a rotatable adjusting ring surrounding the lower segment mounting and having a threaded portion which engages the threaded portion on the lower segment mounting to cause vertical movement of the lower segment mounting in response to rotation of the adjusting ring, an upper segment mounting in which the upper glass segment is mounted, means for releasably attaching the upper segment mounting in a centered position in the lower segment mounting, and adjusting means, actuatable from above the lower segment mounting, for rotating the adjusting ring, whereby both the upper and lower segment mountings are adjusted in height.

Further objects, features and advantages of the present invention will become apparent from the detailed description of preferred embodiments which follows, when considered with the attached drawing.

DETAILED DESCRIPTION OF PREFERRED EMBODIMENTS

According to the invention, in a universal revolving stage of the above-mentioned type, the upper segment mounting is mounted in the lower segment mounting in a centered and releasable manner. For the common adjustment in height of both of the segment mountings, adjusting means are provided which cooperate with the adjusting ring and are actuated from above by an adjusting element. In an advantageous embodiment of the invention, the adjusting means engage the inner teeth of the adjusting ring and may be actuated by means of an insertable adjusting element.

A knurled knob with a multi-sided shaft can serve as the adjusting element. It can be inserted into a corresponding recess in the adjusting means, for example, a pinion. During the rotation of the knurled knob located with its shaft in the recess, the pinion engages the internal teeth of the adjusting ring, the adjusting thread whereof is cooperating with the lower segment mounting. As a result of the fact that the upper segment mounting is centered in the lower one and is frictionally held in it, the common adjustment in height of both segment mountings is effected by the rotation of the knurled knob, whereby the lower segment mounting is screwed up and down during rotation of the adjusting ring by means of the pinion in the adjusting ring.

Figure 1:
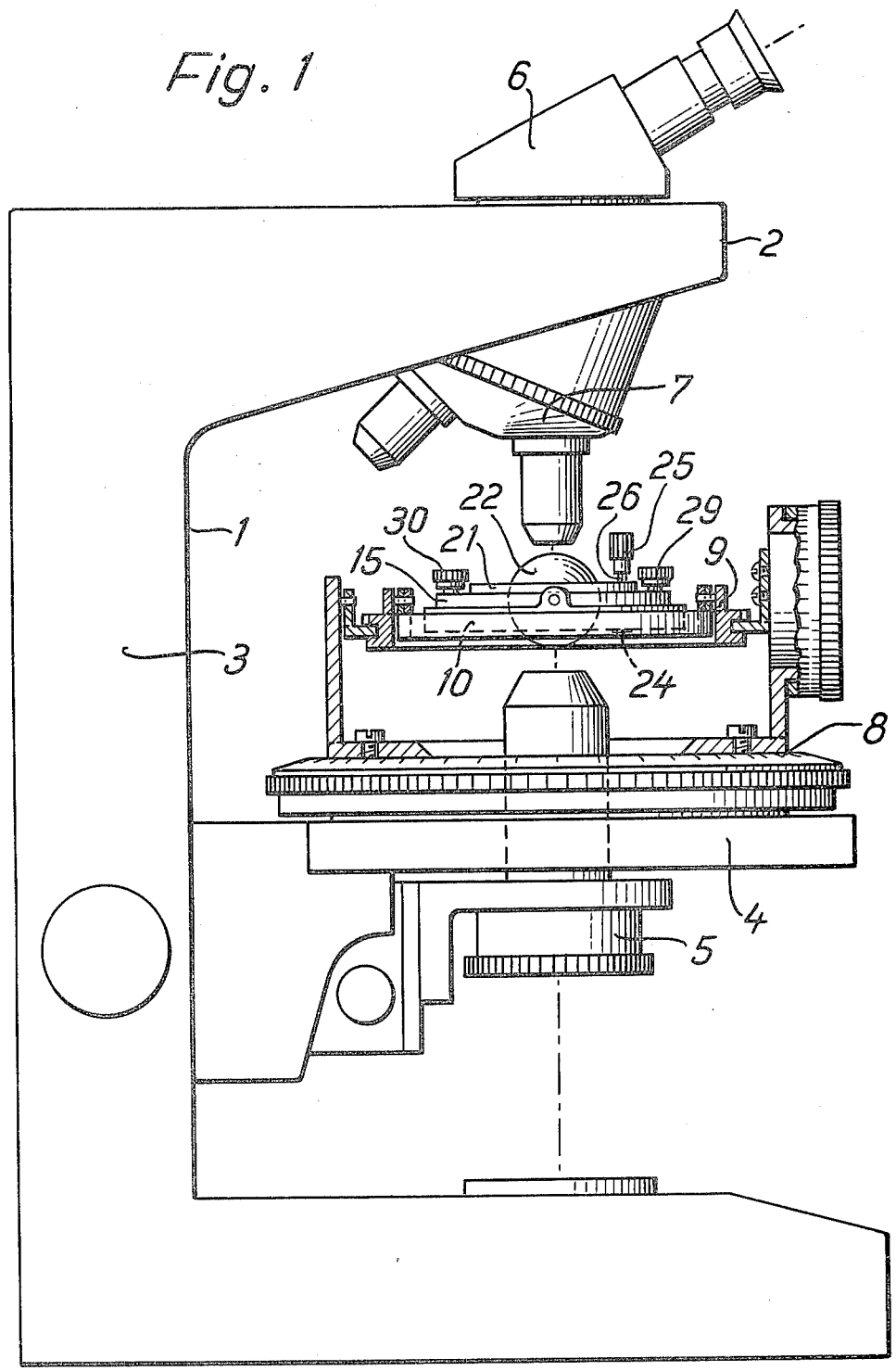
FIG. 1 is a side view of a microscope having a universal revolving stage.

The microscope illustrated in FIG. 1 comprises as essential components a right-angled stand 1 having a horizontal supporting member 2 and a vertical frame 3, on which the microscope stage 4 is attached in a vertically displaceable manner. It includes further a condenser lens 5 arranged beneath the microscope stage 4, an eyepiece tube 6 attached on the upper side of the supporting member 2 and a revolving lens turret 7 arranged on the underside near the forward edge of the supporting member 2. On top of the microscope stage 4 is mounted a conventional universal revolving stage 8, for example, of the type used for optical crystal examinations.

Figure 2:
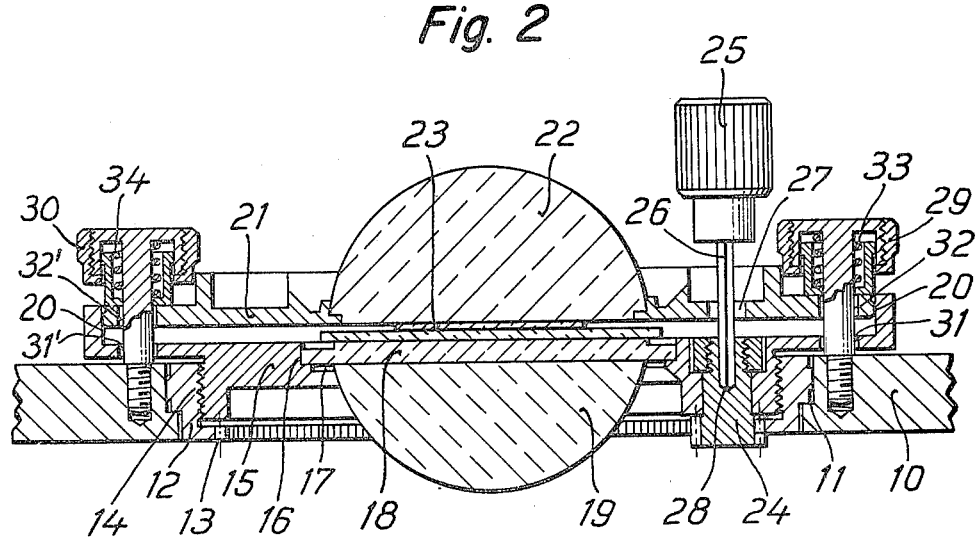
FIG. 2 is a cross-sectional view showing two segment mountings for the device according to the invention.

The universal revolving stage comprises, as a component of a cardan system (FIG. 2), a rotating and pivoting ring 10, which is provided with a support surface 11 to hold an adjusting ring 12. The latter has an internal toothed surface 13 and an adjusting thread 14, into which a lower segment mounting 15 can be screwed.

A shoulder 16 in a circular opening 17 in the lower segment mounting 15 forms the support surface for a carrier plate 18, which is fixedly bonded together with a lower glass segment 19. The lower segment mounting 15 is equipped on its circumference with two guides 20 located diagonally opposite each other; these are advantageously formed integrally on the lower segment mounting 15. An upper segment mounting 21 can be inserted into the guides 20, and an upper glass segment 22 is mounted on the upper segment mounting 21. The sides of the upper segment mounting 21 have a configuration corresponding to the guides 20 of the lower segment mounting 15, i.e., they rest against said guides. In this manner, the glass segments 19, 22 are necessarily centered by means of the guides 20 in a very simple and precise manner. A glass cover plate 23 designed to receive the specimen which is to be studied is placed between the segments 19, 22.

Adjusting means 24, here a pinion, is mounted in the lower segment mounting 15; it engages the internal toothed surface 13 of the adjusting ring 12. To rotate the pinion 24, an adjusting element 25, for example, a knurled knob with a multi-sided shaft 26 is provided. It can be inserted through a bore 27 in the upper segment mounting into a recess 28 in the pinion 24, adapted to the configuration of the shaft 26. It should be understood that in place of the pinion, for example, a toothed wheel with a slit may be used and in place of the knurled knob, a precision screw driver may be used.

Two fastening screws 29, 30 serve to frictionally connect the upper segment mounting 21 with the lower segment mounting 15, in a known manner. The fastening screws pass through the coaxial orifices 31, 32 and 31', 32', while passing through the segment mountings 15, 21, and are screwed with their threads into the ring 10. They are also provided wit a spring housing 33, 34 each, to protect the glass cover plate 23.

What is claimed is:

1. A universal revolving stage for microscopes, comprising:
   upper and lower glass segments positioned one above the other;
   a lower segment mounting in which the lower glass segment is mounted, said lower segment mounting having a threaded portion;
   a rotatable adjusting ring surrounding said lower segment mounting and having a threaded portion which engages the threaded portion on said lower segment mounting to cause vertical movement of said lower segment mounting in response to rotation of said adjusting ring;
   an upper segment mounting in which the upper glass segment is mounted;
   means for releasably attaching said upper segment mounting in a centered position in said lower mounting;
   an adjusting means, actuatable from above said lower segment mounting, for rotating said adjusting ring, whereby both said upper and lower segment mountings are adjusted in height; and
   an adjusting element which is selectively insertable into and removable from said adjusting means.

2. A revolving stage according to claim 1, wherein said means for attaching said upper segment mounting in a centered position in said lower segment mounting comprises at least two guide members attached at diametrically opposite locations on the circumference of said lower segment mounting, said guide members being adapted to engage the circumference of said upper segment mounting.

3. A revolving stage according to claim 1, wherein said adjusting ring includes gear teeth on its inner circumference and wherein said adjusting means engages said gear teeth.

4. A revolving stage according to claim 1, wherein said adjusting element comprises an adjusting knob and a multi-sided shaft attached thereto which is insertable into said adjusting means.

* * * * *